US012524719B2

(12) United States Patent
Dubey et al.

(10) Patent No.: US 12,524,719 B2
(45) Date of Patent: Jan. 13, 2026

(54) SYSTEMS AND METHODS FOR PREDICTING AND MANAGING TOOL ASSETS (71) Applicant: Schlumberger Technology Corporation, Sugar Land, TX (US)

(72) Inventors: Abhishek Dubey, Pune (IN); Sherin Thomas, Kerala (IN); Daniel Viassolo, Katy, TX (US); Magson Zanette, Sugar Land, TX (US); Yuchong Zhang, Houston, TX (US); Ezequiel Saavedra, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 439 days.

(21) Appl. No.: 17/806,026

(22) Filed: Jun. 8, 2022

(65) Prior Publication Data
US 2022/0391807 A1 Dec. 8, 2022

Related U.S. Application Data (60) Provisional application No. 63/208,162, filed on Jun. 8, 2021.

(51) Int. Cl.
G06Q 10/0631 (2023.01)
G06Q 10/0635 (2023.01)
G06Q 10/20 (2023.01)

(52) U.S. Cl.
CPC ......... G06Q 10/06315 (2013.01); G06Q 10/0635 (2013.01); G06Q 10/20 (2013.01)

(58) Field of Classification Search
CPC ......... G06Q 10/06315; G06Q 10/0635; G06Q 10/20
See application file for complete search history.

(56) References Cited

U.S. PATENT DOCUMENTS 8,825,414 B2 9/2014 Garvey et al.
9,784,099 B2 10/2017 Kale
(Continued)

OTHER PUBLICATIONS

Thomas et al., Digital Fleet Management: A Scalable Cloud Framework Based on Data-Driven Prediction Models, Annual Conference of the Prognostics And Health Management Society. 2020, 8 pages.
(Continued)

Primary Examiner — Francis Z. Santiago Merced
(74) Attorney, Agent, or Firm — Jeffrey D. Frantz (57) ABSTRACT A scalable digital fleet management system may be leveraged by organizations with high-volume high-value assets. In such scenarios, predictive analytics for tool health enables decision-making in terms of planning, maintenance, end-of-life replacement, tool selection, etc. An end-to-end solution spans all the way from gathering live tool data to visual representations of tool health. Long-term fleet management can be accomplished through a consistent evaluation of the fleet performance profile. Predictive analysis can anticipate maintenance needs and resultant downtimes and help improve scheduling of procurement and distribution of the fleet. Framework deployment focuses on topics related to developing an end-to-end solution architecture, scaling, and deploying it on demand, and maintaining it going forward. Sustenance and algorithm development focuses on defining a risk index, developing machine learning algorithms for different tools, defining a single comparison metric, and deciding when to trigger automated re-training for each tool.

21 Claims, 6 Drawing Sheets (56) References Cited

U.S. PATENT DOCUMENTS

| | | | |
|---|---|---|---|
| 10,620,612 B2 | 4/2020 | Chao | |
| 2008/0288198 A1* | 11/2008 | Francino | F23N 5/242 |
| | | | 702/179 |
| 2009/0178161 A1* | 7/2009 | Arar | C12N 15/8214 |
| | | | 435/468 |
| 2017/0006135 A1* | 1/2017 | Siebel | H04L 67/10 |
| 2020/0208500 A1 | 7/2020 | Jacks et al. | |
| 2020/0208501 A1 | 7/2020 | Jacks et al. | |
| 2022/0118576 A1* | 4/2022 | Lin | B23Q 17/0952 |

OTHER PUBLICATIONS

Alsyouf, I., The role of maintenance in improving companies' productivity and profitability. International Journal of Production Economics. 105. pp. 70-78, 2007.

Apiletti et al., iSTEP, an Integrated Self-Tuning Engine for Predictive Maintenance in Industry 4.0. 2018 IEEE Intl Conf on Parallel Distributed Processing with Applications, Ubiquitous Computing Communications, Big Data Cloud Computing, Social Computing Networking, Sustainable Computing Communications (ISPA/IUCC/BDCloud/SocialCom/SustainCom), pp. 924-931, 2018.

Austin et al., Interpreting the concordance statistic of a logistic regression model: relation to the variance and odds ratio of a continuous explanatory variable. BMC medical research methodology, 12, 82, 2012, 8 pages.

Ji et al., Big Data Processing in Cloud Computing Environments. Proceedings of the 2012 12th International Symposium on Pervasive Systems, Algorithms and Networks (ISPAN 12). IEEE Computer Society, USA, pp. 17-23, 2012.

Kothamasu et al., System Health Monitoring and Prognostics—A Review of Current Paradigms and Practices. International Journal of Advanced Manufacturing Technology 28, pp. 1012-1024, 2006.

Laidler K. J. The development of the Arrhenius equation, Journal of Chemical Education 1984 61 (6), pp. 494-498, 2018.

Lee et al., Recent advances and trends in predictive manufacturing systems in big data environment. Manufacturing Letters, vol. 1, Issue 1, 2013, pp. 38-41, ISSN 2213-8463, 2013.

Lee et al., Methodology and Framework of a Cloud-Based Prognostics and Health Management System for Manufacturing Industry. Chemical Engineering Transactions 33, pp. 205-210, 2013.

Mahmud et al., Cloud enabled data analytics and visualization framework for health-shocks prediction. Future Generation Computer Systems. 45 pages, ISSN 0167-739X, 2015.

Mohammadpoor et al., Big Data analytics in oil and gas industry: An emerging trend. Petroleum, ISSN 2405-6561, pp. 321-328, 2018.

Moir, et al., Prognostics and health management in the oil gas industry—a step change. In Proceedings of the European Conference of the PHM Society (vol. 4 (1)), 19 pages, 2018.

Mounir, N., et al. Integrating Big Data: Simulation, Predictive Analytics, Real Time Monitoring, and Data Warehousing in a Single Cloud Application. OTC_28910-MS. Offshore Technology Conference. Apr. 2018, 14 pages.

Nguyen et al., Borderline over-sampling for imbalanced data classification. International Journal of Knowledge Engineering and Soft Data Paradigms. vol. 3, No. 1, pp. 4-21, 2011.

Pop, D., Machine Learning and Cloud Computing: Survey of Distributed and SaaS Solutions. Institute e-Austria Timisoara, Timisoara, Austria, 12 pages, 2016.

Schwabacher et al., A survey of artificial intelligence for prognostics. AAAI Fall Symposium—Technical Report, 2007, 8 pages.

\* cited by examiner

SYSTEMS AND METHODS FOR PREDICTING AND MANAGING TOOL ASSETS

CROSS-REFERENCE TO RELATED APPLICATION

This application claims priority to and the benefit of U.S. Provisional Patent Application Ser. No. 63/208,162, entitled "A System and Method for Predicting and Managing Tool Assets," filed Jun. 8, 2021, which is hereby incorporated by reference in its entirety for all purposes.

FIELD OF THE INVENTION

Aspects of the disclosure relate to tool asset management. More specifically, aspects of the disclosure provide for performing risk assessments of tool assets based on historical tool asset data and determining a failure probability for each tool asset.

BACKGROUND INFORMATION

Organizations often use an asset management system to govern, track, and manage a large amount of tool assets based on tool health conditions and other tool operational variables. Tool asset management continues to have considerable impacts on an organization's competitive growth as the asset management system facilitates various operations related to the tool assets with improved cost and time efficiencies. Without appropriate tool asset management, resulting impact of unplanned events (e.g., tool downtime) in organizations (e.g., oil and gas companies) may be significant, as the unplanned events may lead to production outages and, in turn, revenue loss.

SUMMARY

A summary of certain embodiments described herein is set forth below. It should be understood that these aspects are presented merely to provide the reader with a brief summary of these certain embodiments and that these aspects are not intended to limit the scope of this disclosure.

In one non-limiting embodiment, a method includes receiving tool data comprising at least one of a maintenance history and a failure history for each tool of a plurality of tools. The method also includes generating a risk assessment factor for each tool of the plurality of tools based on the at least one of the maintenance history and the failure history. The method further includes comparing risk assessment factors of two or more tools of the plurality of tools. In addition, the method includes determining a probability of failure for each tool of the plurality of tools based on the comparison of the risk assessment factors.

In another example embodiment, a system for managing a plurality of tools of an organization in a cloud computing environment includes an organizational data lake storing tool data associated with the plurality of tools. The system also includes a project data pond associated with ongoing projects related to the plurality of tools. The project data pond continuously receives the tool data from the organizational data lake. The system further includes an on-demand data extract, transform, and load (ETL) component communicating the tool data with the project data pond. In addition, the system includes a project code repository storing a plurality of templates corresponding to a plurality of tool models digitally and mathematically representative of the plurality of tools. The system also includes a framework orchestration and monitoring platform configured to manage the ongoing projects.

In another example embodiment, a non-transitory, computer-readable medium storing instructions that, when executed by one or more processors, are configured to cause the one or more processors to receive tool data comprising at least one of a maintenance history and a failure history for each tool of a plurality of tools, to generate a risk assessment factor for each tool of the plurality of tools based on the at least one of the maintenance history and the failure history, to compare risk assessment factors of two or more tools of the plurality of tools, and to determine a probability of failure for each tool of the plurality of tools based on the comparison of the risk assessment factors.

BRIEF DESCRIPTION OF THE DRAWINGS

Various aspects of this disclosure may be better understood upon reading the following detailed description and upon reference to the drawings, in which.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to describe certain embodiments more clearly.

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, it will be appreciated that the data processing and control systems described herein may be configured to perform any and all of the data processing and control functions described herein automatically.

In addition, as used herein, the term "substantially similar" may be used to describe values that are different by only a relatively small degree relative to each other. For example, two values that are substantially similar may be values that are within 10% of each other, within 5% of each other, within 3% of each other, within 2% of each other, within 1% of each other, or even within a smaller threshold range, such as within 0.5% of each other or within 0.1% of each other.

Large-scale asset management systems are often utilized to develop dynamically scalable, distributed, and fully automated systems that may enable timely information gathering, knowledge sharing and maintenance scheduling. For example, variants of asset maintenance (e.g., tool maintenance) may include corrective, time-based, and condition-based predictive maintenance. The predictive maintenance may include functionalities, such as preprocessing, fault prognosis, and post-action prognosis. Cloud-based frameworks utilizing distributed cloud services may be used to provide such functionalities for the predictive maintenance.

For instance, a large organization, such as an oil and gas company, may use a tool asset management system to manage a relatively large fleet (e.g., thousands) of tool assets (e.g., drilling tools, downhole tools, data acquisition and processing tools, and so forth) based on various tool operational variables (e.g., real-time tool health conditions, historical tool operational data, and so forth). The tool asset management systems may allow the organization to monitor operational statuses of the tool assets, determine health conditions of the tool assets, perform risk assessments of the tool assets (e.g., based on historical tool asset data), determine failure probabilities for the tool assets, provide predictive maintenance, and so forth. Lack of proper tool asset management may result in undesired events (e.g., tool failures, system downtime caused by the tool failures, and so forth), which may have significant impacts (e.g., suspended oil or gas production).

Increased availability of monitoring data, such as monitored tool operational data, may be utilized to build data-driven applications that may increase the productivity through improved efficiency of tool asset management (e.g., tool failure risk assessment, predictive tool maintenance, and so forth). For example, historical maintenance and failure data of the tool assets may be combined to form a weighted tool data source (e.g., an organization data lake) for predicting tool failure probabilities. The tool asset management system may facilitate large data flows of the monitoring data through a structured and automated data channel that enables fast and reliable identification of impending tool failures, and preventing undesired events caused by various factors (e.g., human-errors, bias and assumptions, and so forth). State-of-the-art technologies, such as machine learning (ML), cloud computing, and big data may be incorporated into the tool asset management system to enhance the efficiency of the tool asset management.

The present disclosure relates to an end-to-end automated scalable cloud-based framework, which integrates failure prediction models for each tool asset in a large fleet of tool assets. Based on historical tool asset data, the failure prediction models may generate tool risk indices (e.g., one index per each tool asset). The tool risk indices may correlate to probabilities of tool failure during near-future field operations using the tool assets. The tool risk indices may be used for creating optimized asset-to-operation mappings (e.g., mapping specific tool assets that match corresponding field operations with maximized productivity and minimized failure probability). The tool risk indices may also allow risk mitigation relating to field operations by identifying tool assets for overhaul or retirement. The disclosed methods may integrate tasks of retrieving (e.g., using big data mining) relevant data from a group of tool assets corresponding to a specific field operation, performing tool feature engineering and modeling via machine learning, and visualizing into a cloud pipeline. The end-to-end automated scalable cloud framework may provide framework scalability to facilitate the field operations when the size of the large fleet of tool assets increases or decreases over time to match different operational conditions. The end-to-end automated scalable cloud framework may also allow for framework flexibility and adaptivity (e.g., adding new machine learning models to the framework by users having limited knowledge of cloud computing).

Additionally, the end-to-end automated scalable cloud framework may provide a generic architecture for framework deployment that allows automatic scaling up and down based on variant operational conditions of the field operations. The end-to-end automated scalable cloud framework may provide (e.g., via integrated visualization tools) information relating to activities and issues of the tool assets in real time. The end-to-end automated scalable cloud framework may be configurable with limited coding effort, allowing users with limited coding experience to use the framework (e.g., easy and stable onboarding of new tool models). Furthermore, the end-to-end automated scalable cloud framework may provide capabilities for storing large amounts of final output data with suitable visualizations and for inbuilt role level access management.

Further, the end-to-end automated scalable cloud framework may include various algorithms (e.g., data mining, data transformation, data processing, modeling and simulation, predictions, and so forth). In some embodiments, certain algorithms may define and interpret the tool risk indices for each tool asset. For a given tool asset, the end-to-end automated scalable cloud framework may compare various algorithm's prediction accuracies (e.g., with different output scales) to select a specific algorithm to implement for the given tool asset. In some embodiments, the end-to-end automated scalable cloud framework may compare predictions and model training across different tool asset families that may be related to the given tool asset, and determine when to trigger additional steps (e.g., automatic model re-training) for the given tool asset.

Figure 1:
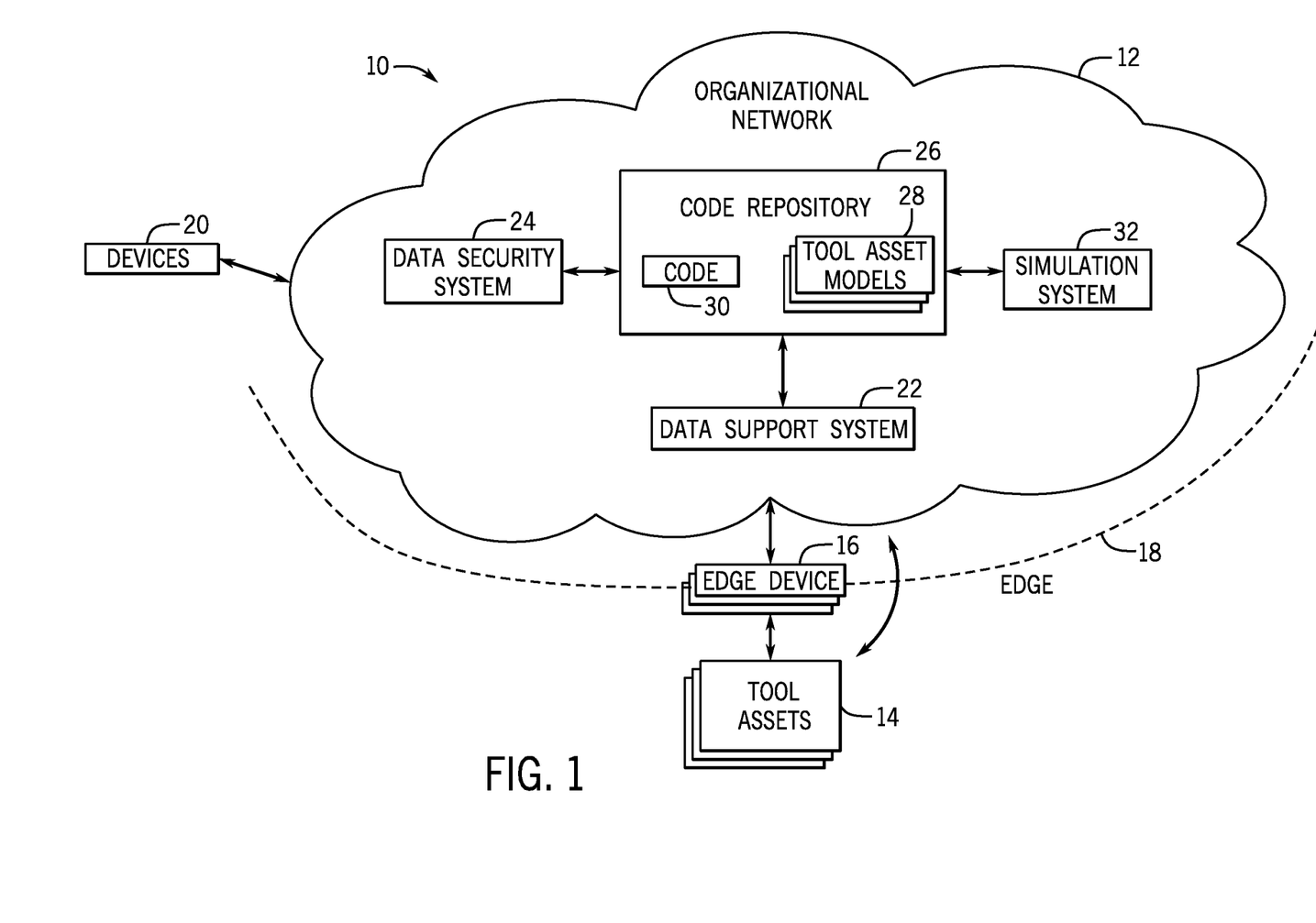
FIG. 1 depicts a schematic diagram of a system for tool asset management, in accordance with embodiments of the present disclosure.

By way of introduction, FIG. 1 depicts a schematic diagram of a system 10 for tool asset management. The system 10 may include an organizational network 12. The organizational network 12 may be implemented by a variety of computing devices (e.g., cloud computing devices), storage devices, and connecting devices (e.g., routers, switches, gateways). The system 10 may include a number of tool assets 14. Some of the tool assets 14 may be communicatively connected to the organizational network 12 via respective edge devices 16 (e.g., edge computing devices) located at an edge 18 of the organizational network 12, whereas others may be communicatively coupled to the organizational network 12 without using the edge devices 16. Users (e.g., data scientists, administrators, reliability engineers, job planners, and so forth) may use devices (e.g., computing devices) to access the organizational network 12.

As illustrated, the organizational network 12 may include a data support system 22, a data security system 24, a code repository 26, and a simulation system 32. Each of the data support system 22, the data security system 24, the code repository 26, and the simulation system 32 may include one of more processors of the computing devices that may execute computer-readable instructions stored on memory/storage devices of the computing devices. The code repository 26 may include code 30 and a number of tool asset models 28. The tool asset models 28 may be virtual instances (e.g., digital representations) of the respective tool assets 14. The tool asset models 28 may provide flexible ways in which the system 10 may be implemented to remotely monitor and control the tool assets 14. For example, data scientists may use the devices 20 to access the tool asset models to remotely monitor, operate, troubleshoot, or maintain corresponding tool assets 14.

The system 10 may use the organizational network 12 to facilitate data communication between the tool assets 14, the edge devices 16, the devices 20, the data support system 22, the data security system 24, the code repository 26, and the simulation system 32. The organizational network 12 may include one or more wired or wireless networks, including, but not limited to, local area networks (LANs), wide area networks (WANs), wireless WANs (WWANs), wireless LANs (WLANs), mobile communications networks (e.g., 3G, 4G, 5G, Edge, etc.), and so forth. For example, the asset management system 50 may use a local area network (LAN) that includes a variety of computing and network devices including, but not limited to, switches, servers (e.g., processors), storage (e.g., memory), and routers. The above-mentioned systems/devices may communicate with each other using a variety of communication protocols, such as Open Database Connectivity (ODBC), TCP/IP Protocol, Distributed Relational Database Architecture (DRDA) protocol, Database Change Protocol (DCP), HTTP protocol, Bluetooth, Wi-Fi, Near Field Communication (NFC), other suitable current or future protocols, or combinations thereof.

The edge devices 16 may include network routers and/or switches that may be located at the edge 18. The edge devices 16 may serve as local hubs for data transfers between the tool assets 14 and the organizational network 12. The edge devices 16 may be strategically positioned within the organizational network 12 to access or receive data associated with the tool assets 14. Additionally, the edge devices 16 may perform various types of analyses on the received data, and may then control and operate the respective tool assets 14 more efficiently or effectively based on the results of the analyses.

The data support system 22 may enable the tool assets 14 to report tool asset data within a hierarchy (e.g., a tool hierarchy) that is interpretable by multiple users within the system 10. The tool asset data may be stored in a data pool or data lake and used by other systems (e.g., simulation system 32) to perform tool-based operations (e.g., tool asset model development, validation, testing, and so forth).

The data security system 24 may coordinate a number of data sources (e.g., the tool assets 14, the edge devices 16, the device 20, the data support system 22, the data security system 24, the code repository system 26, and the simulation system 32) and analyze the tool asset data. The data security system 24 may determine data access rights associated with individual users. Based on the data access rights, the individual users may retrieve certain tool asset data to perform various tool-based operations (e.g., tool asset machine learning model development, validation, testing, and so forth).

The code repository system 26 may perform a data repository service for hosting the tool asset models 28 and the code 30. The code 30 may include a set of code created as digital and mathematical representations of the tool asset models 28 (e.g., machine learning models). The code repository system 26 may provide templates (e.g., code templates) for users. Each template may include standard code representative of a type of tool asset or tool asset family. The users may check out the templates and customize the templates based on specific details of a corresponding tool asset.

In addition to hosting the tool asset models 28 and the code 30, the data repository service may emulate the tool asset models 28 in a cloud-based environment to determine how the tool asset models 28 will operate. For example, the users (e.g., data scientists) may run emulations using the simulation system 32, which may implement various emulation techniques and services that may be utilized to assist the users with tool asset model development, validation, and testing. In some embodiments, the simulation system 32 may be used to simulate code performance after code updates.

It should be noted that the components described above with regard to the system 10 are merely examples, and the system 10 may include additional or fewer components relative to the illustrated embodiment.

Figure 2:
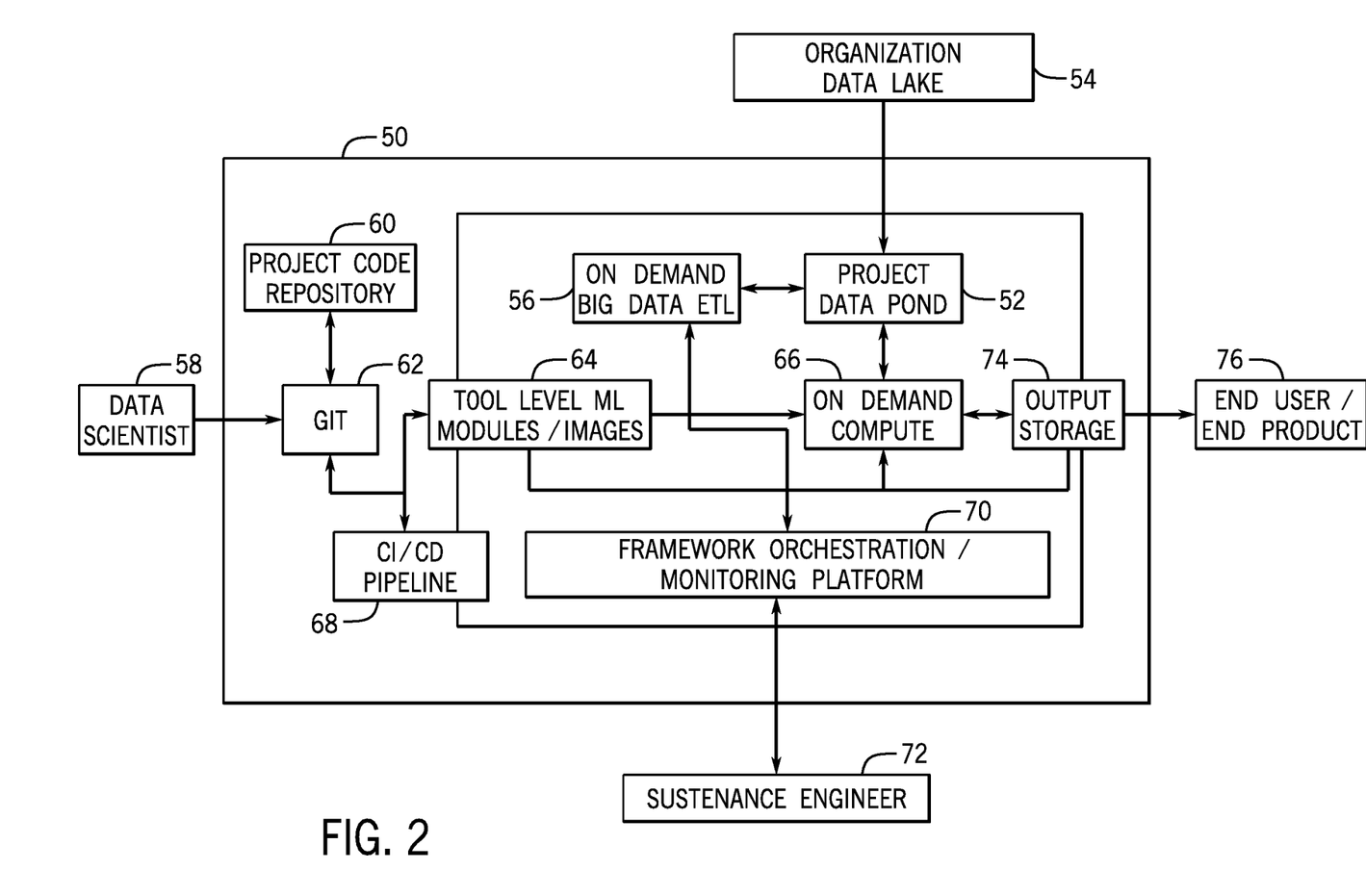
FIG. 2 depicts a schematic diagram of a high-level architecture for an end-to-end digital tool asset management system, in accordance with embodiments of the present disclosure.

With forgoing in mind, FIG. 2 depicts a schematic diagram of a high-level architecture for an end-to-end digital tool asset management system 50. The end-to-end digital tool asset management system 50 may include a project data pond 52 associated with ongoing projects (e.g., tool modeling, machine learning, and so forth) related to various tool assets. The project data pond 52 may include a global schema at the organization level that may be used to separate different tool asset data associated different tool assets for different projects. The project data pond 52 may continuously receive the tool asset data from an organizational data lake 54 through an ingestion/subscription service. In some embodiments, the data ingestion/subscription service may be provided at an organization level and not at a project/team level through a separate dedicated data platform team.

After the tool asset data is ingested into the project data pond 52, an on-demand data ETL (extract, transform, and load) component 56 may extract the tool asset data from the project data pond 52, transform the extracted data into a clean and analysis-ready format (e.g., a pre-defined data format specific to, or otherwise acceptable within, the organization), and load the transformed data back into the project data pond 52 or into other components of the end-to-end digital tool asset management system 50 for data analysis and processing.

In some embodiments, the on-demand data ETL component 56 may be enabled on-demand (e.g., with system or user instructions) or based on a pre-determined time schedule (e.g., a daily basis) for ETL operations such as big data segregation and preprocessing. For example, a tool risk index prediction may run once a day, or at some other periodic time interval. After completing the ETL operations, the on-demand data ETL component 56 may be disabled. In some embodiments, the on-demand data ETL component 56 may use certain third-party components or services (e.g., Google DataFlow) in case of real time data ETL operations. In some embodiments, the on-demand data ETL component 56 may use other third-party components or services (e.g., Google DataProc) for batch ETL operations. In some embodiments, the on-demand data ETL component 56 may run multiple small instances or a single large instance.

A data scientist 58 may be assigned to the project. The end-to-end digital tool asset management system 50 may determine data access rights associated with the particular data scientist 58. Based on the data access rights, the data scientist 58 may retrieve certain tool asset data to develop a machine learning model for a particular tool asset. The machine learning model may enable simulations of various operational conditions or health conditions of the tool asset. The machine learning model may be trained with historical data (e.g., historical maintenance data, failure data) in the tool asset data. A set of code may be created as a digital and mathematical representation of the machine learning model. After the machine learning model is developed, tested, and validated, the set of code may be packaged as a separate training, validation, and testing module. The set of code may be pushed to a project code repository 60. The data scientist 58 may track code changes throughout a lifetime of the project via a code tracking component 62 (e.g., Global Information Tracker (GIT)). The code tracking component 62 may also govern the operations of the project code repository 60 (e.g., code check-in or check-out, code deletion, and so forth).

In some embodiments, the data scientist 58 may have expertise in tool asset modeling, but may have limited experience in coding. The data scientist 58 may check out a template (e.g., code template) from the project code repository 60. The template may include standard code representative of a type of tool asset or tool asset family that is related to the tool asset in the project. The data scientist 58 may customize the template based on specific details of the tool asset (e.g., tool settings, tool operation conditions, tool simulation conditions, tool health conditions, and so forth). In this way, users with limited coding experience may be able to utilize functionalities provided by the end-to-end digital tool asset management system 50 for the tool modeling project.

The end-to-end digital tool asset management system 50 may include a tool level machine learning modules and images component 64 connected with the code tracking component 62. The tool level machine learning modules and images component 64 may provide a variety of functions. For example, the tool level machine learning modules and images component 64 may enable the data scientists 58 to add machine learning models to the end-to-end digital tool asset management system 50 (e.g., to the project code repository 60 via the code tracking component 62) without significant knowledge of cloud computing and/or an actual system architecture. The tool level machine learning modules and images component 64 may provide for submitting different code modules (e.g., individual model training, validation, and testing) for the tool asset to run on-demand computing 66 in parallel in a cloud computing environment.

The end-to-end digital tool asset management system 50 may also include a continuous integration and continuous delivery (CI/CD) pipeline component 68. The CI/CD pipeline component 68 provides functions for code development practices in which incremental code changes are made frequently and reliably. For example, the CI/CD pipeline component 68 may enable data scientists 58 to frequently deliver applications (e.g., customized machine learning models associated with different tool assets) to different users by introducing code automations into stages of code development. The code automations may allow the data scientist 58 with little or no coding knowledge to automate code development processes, such as automatic generating new templates, automatic customizing templates with user input and guidance, automatic generating code to run simulations, validations, and tests with developed models, and so forth. In some embodiments, the CI/CD pipeline component 68 may provide built-in visualization through visual modules so that the data scientist 58 may perform code development easily and quickly.

After the data scientist 58 develops a machine learning model, code associated with the different code modules may be packaged for training, testing, and validation into a predefined structure and committed to a central project code repository (e.g., the project code repository 60). For example, after the code is pushed into the project code repository 60, the project code repository 60 may validate the code (e.g., based on the predefined structure) and allow the code to be merged into a main code branch of the project. A cloud build may be used to run a set of standard basic test cases. After the set of standard basic test cases passes or succeeds, the cloud build may build a model docker container image, and save the model docker container image to a container registry.

Running a model (e.g., the machine learning model) in a container may increase portability of the model and avoid restricting a user (e.g., the data scientist 58) from selecting specific tool assets or technology limited by the end-to-end digital tool asset management system 50. The model in the container may be deployable to other digital tool asset management systems having different hardware and operating systems with flexible sets of software packages defined in corresponding containers associated with the other digital tool asset management systems.

The end-to-end digital tool asset management system 50 may further include a framework orchestration and monitoring platform 70 to manage a workflow associated with the development of the machine learning model. The framework orchestration and monitoring platform 70 may be used to perform a variety of platform jobs. In some embodiments, the framework orchestration and monitoring platform 70 may include orchestration tools that may, with minimal code or configuration, schedule tasks (e.g., operations associated with the project data pond 52, the on-demand big data ETL component 56, the project code repository 60, the code tracking component 62, the tool level machine learning modules and images component 64, the on-demand computing 66, and the CI/CD pipeline component 68), and provide an interface allowing users (e.g., the data scientist, an administrator) to visualize, monitor, and troubleshoot the tasks. In some embodiments, the framework orchestration and monitoring platform 70 may use certain third-party components or services (e.g., Google Cloud Composer built on top of Apache Airflow) as a cross-platform support to manage the workflow orchestration. In some embodiments, the framework orchestration and monitoring platform 70 may provide an inbuilt monitoring web application to monitor real time task or platform statuses and keep a history of all past tasks.

In some embodiments, a platform sustenance engineer 72 may schedule and monitor the platform jobs using the framework orchestration and monitoring platform 70. In some cases, unless there are major component or workflow changes, the platform sustenance engineer 72 may configure the framework orchestration and monitoring platform 70 via relatively simple platform setting/parameter updates.

In some embodiments, based on the settings/parameters of the framework orchestration and monitoring platform 70, machine learning model training and validation jobs for a first group of tool assets may be retrieved (e.g., from the project code repository 60) and scheduled for running the on-demand computing 66 in parallel for the first group of tool assets on a first computing platform (e.g., an artificial intelligence (AI) platform). At the same time, prediction jobs (e.g., failure prediction jobs) for a second group of tool assets may be scheduled in parallel on a second computing platform (e.g., a cloud-based AI platform). The training, validation, and prediction jobs may be run as separate jobs monitored by the framework orchestration and monitoring platform 70. In some embodiments, the training, validation, and prediction jobs may be submitted as pay-per-use jobs. The first and the second computing platforms are highly scalable to run many parallel jobs at a given time frame.

Output data of the training, validation, and prediction jobs may be stored in an output storage component 74. For example, the output storage component may include a data warehouse (e.g., Google Big Query) that may enable scalable data analysis. The data warehouse may support querying jobs using structured query language (SQL) (e.g., the American National Standards Institute (ANSI) SQL). The output data may include tool level risk index, features used for tool asset modelling, other tool level details, and a validation score for each training job, and so forth. The output data may be used by an end user or end user product 76, provided the end user or end user product 76 are authenticated for the output data. For example, the end user or end user product 76 may receive the output data over communication protocols (e.g., Hypertext Transfer Protocol (HTTP), Hypertext Transfer Protocol Secured (HTTPs) using Representational State Transfer (REST) calls made from the end user or end user product 76 to a server (e.g., a server governing the data warehouse). In some embodiments, the validation score for each training job may be further used by a separate orchestration platform to decide whether a tool family needs re-training.

In some embodiments, the end user or end user product 76, depending on a permission level, may receive and use the output data in the data warehouse through an application program interface (API) (e.g., RESTful API). The API provides relatively smooth integration across all times of data usage, such as visualization tools, web application, mobile application, and so forth. In some embodiments, end users may work with other users (e.g., reliability engineers, job planners, etc.) for usability features to be included in end user products (e.g., visualization tools).

After the end-to-end digital tool asset management system 50 supported by a cloud or infrastructure team (e.g., the separate dedicated data platform team) is in place, an asset fleet of a potentially large scale of an organization may be systematically on-boarded to the end-to-end digital tool asset management system 50. The end-to-end digital tool asset management system 50 allows the organization to break down and define tool asset modelling tasks with reduced time (e.g., coding time) and cost.

The organization may deploy the architecture for the end-to-end digital tool asset management system 50 on an on-premises infrastructure/platform, on a cloud platform, or a combination of both. For example, the organization may deploy the architecture on an organization-operated computing platform integrated with an existing cloud platform (e.g., Google Cloud Platform). A software engineering team may work on developing and setting up a cloud/on-premises platform.

The end-to-end digital tool asset management system 50 may be implemented by a variety of computing devices (e.g., cloud computing devices), storage devices, and connecting devices (e.g., routers, switches, gateways). Each of the on-demand big data ETL component 56, the project code repository 60, the code tracking component 62, the tool level machine learning modules and images component 64, and the CI/CD pipeline component 68 may include one of more processors of the computing devices that may execute computer-readable instructions stored on memory/storage devices of the computing devices to perform the operations described above. It should be noted that the components described above with regard to the end-to-end digital tool asset management system 50 are examples and the end-to-end digital tool asset management system 50 may include additional or fewer components relative to the illustrated embodiment.

Figure 3:
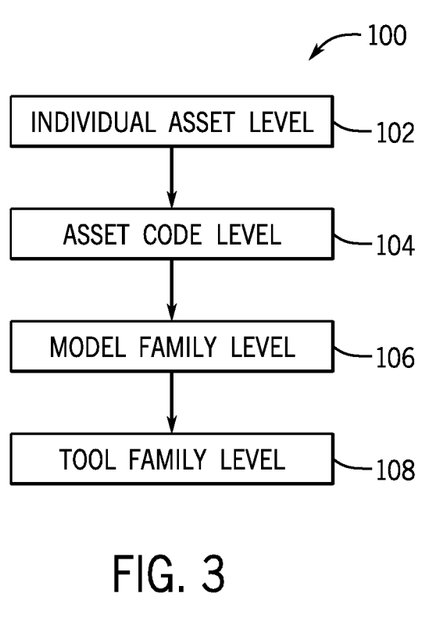
FIG. 3 depicts a flow chart of tool hierarchies, in accordance with embodiments of the present disclosure.

FIG. 3 depicts a flow chart of a tool hierarchy 100. The end-to-end digital tool asset management system 50 may use the tool hierarchy 100 to break down and define tool asset modelling tasks described above. Individual tool assets may be defined at an individual asset level 102 based on characteristics (e.g., tool specification, model number, and so forth) of the individual tool assets.

Based on definitions of the individual tool assets, the end-to-end digital tool asset management system 50 may determine a code for each tool asset at an asset code level 104. Certain tool assets having the same code belong to the same asset code family. For example, two different tool assets may have the same specification and model number, but different usage histories (e.g., tool usage time, tool usage environment, and so forth). In some embodiments, two tool assets may have different model numbers and slightly different specifications (e.g., one tool asset may be revised based on another tool asset).

In some cases, there may only be a minor difference between two asset code families, like a tool revision. The end-to-end digital tool asset management system 50 may combine the two asset code families into a broader group, such as a model family at a model family level 106. The tool assets belonging to the same model family may be modeled together using same or similar machine learning models. In some embodiments, each of the machine learning models may be deployed at the model family level 106. In some embodiments, the machine learning models may be deployed at other levels as well based on properties of the tool assets.

At a tool family level 108, the end-to-end digital tool asset management system 50 may separate the individual tool assets having different codes and belonging to different model families into different tool families based on type of job/measurement (e.g., nuclear measurement, resistivity measurement, induction measurement, and so forth) performed by each tool asset family.

A large scale organization may have a large asset fleet. For example, the large asset fleet may include 2,000,000 individual tools at the individual asset level 102, with an average of 400-500 tools combined at the asset code level 104, and an average of 5-10 asset codes combined at the model family level 106.

The end-to-end digital tool asset management system 50 may use the machine learning models deployed at the model family level 106 to analyze (e.g., identify) or predict long-term data trends (e.g., production trends, temperature trends, nuclear reaction trends, and so forth). For example, some of the tool assets may not show certain trends (e.g., tool failure trends) at the individual tool level 102 using corresponding individual tool data. For the tool assets not showing the tool failure trends at the individual tool level 102 and belonging to the same model family, the individual tool data may be aggregated as an input for the machine learning models deployed at the model family level 106 for failure trend identification or prediction.

For modelling the tool assets at the individual tool level 102, each tool asset modeling job acts as one data point for a training algorithm, whereas for modelling the tool assets at the model family level 106, each bucket of aggregator indices acts as one data point. For example, Arrhenius equivalent hours is one of the widely used aggregator indices. In this case, the Arrhenius equivalent hours spent by a tool asset in each tool asset modeling job is computed. Next, a bucket bin size is fixed as a hyperparameter to aggregate all the tool asset modeling jobs in the bucket bin as one data point for the modelling algorithms. Such model family level job aggregation may enable users to identify certain tool assets that have relatively small failure probabilities (e.g., not showing failure treads at the individual tool level 102). Such small failure probabilities may be related to long-term aggregated tool history.

Figure 4:
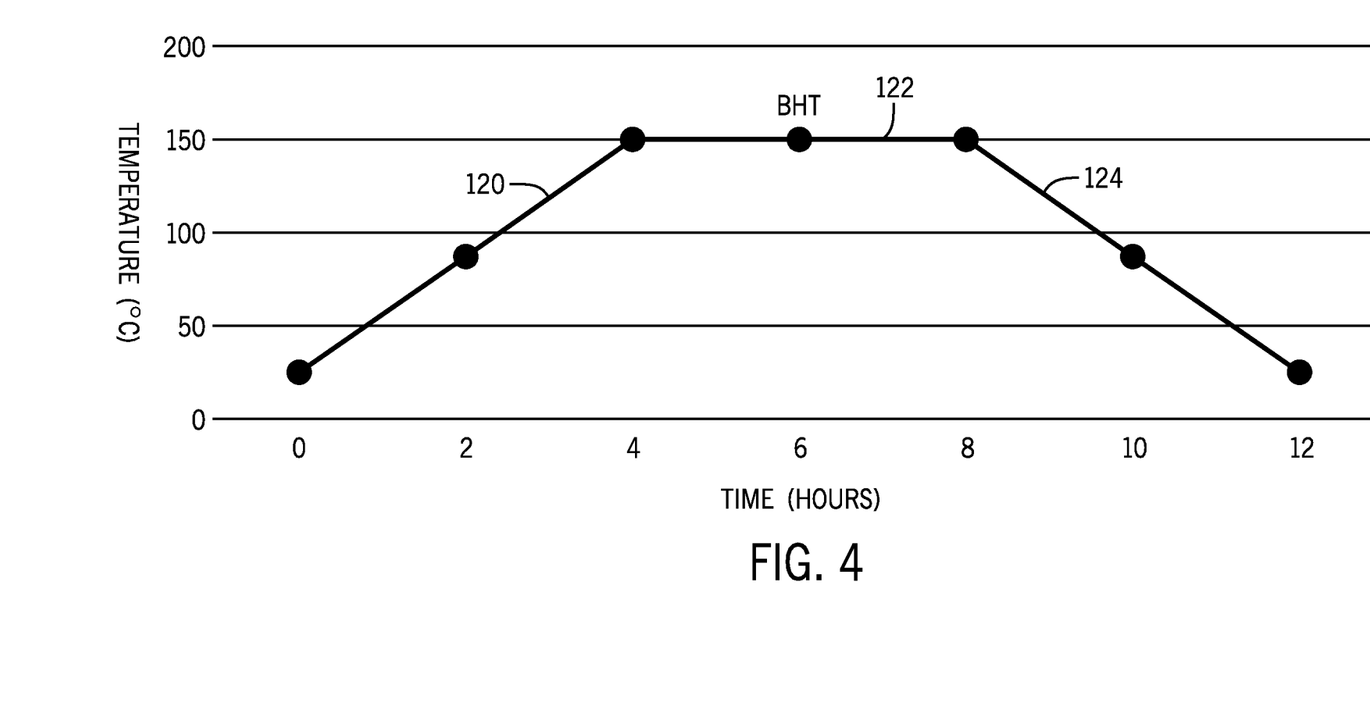
FIG. 4 depicts a graph of calculating Arrhenius equivalent hours by one temperature and time entry point, in accordance with embodiments of the present disclosure.

FIG. 4 depicts a graph of calculating Arrhenius equivalent hours by one temperature and time entry point. Total Arrhenius equivalent hours spent by a tool asset is calculated by splitting operating time ($t_{operation}$) of the tool asset into three sections. The first section 120 shows a rise in temperature, the second section 122 has a relatively constant temperature equal to the Bore Hole Temperature (BHT) and the final section shows a drop in the temperature back to the initial temperature. The total Arrhenius equivalent hours may be determined using the following equation:

$$t_{spent} = t_{operation} \cdot AF \qquad (1)$$

where AF is the Acceleration Factor determined as:

$$AF = e^{\,Ea/h(1/T_{ref} - 1/T_o)} \qquad (2)$$

where $E_a$ is the activation energy (eV), h is the Boltzmann's constant (8.617343×10−5 eV/° K), $T_{ref}$ is the reference temperature (e.g., 150° C. for some tool families) in Kelvin and $T_o$ is the operating temperature in Kelvin.

The temperature may be sampled at equal intervals (e.g., 2 hours) with the distribution as shown in FIG. 4, and the total Arrhenius equivalent hours spent by the tool asset may be calculated in each of the three sections 120, 122, and 124. The overall idea is to model the trend of the tool failures. Though modeling each subset of temperature samples corresponding to a different range of Arrhenius equivalent hours, the modeling tool asset may yield similar failure probability trends, but the actual failure values may differ at the subset level, as shown in FIG. 5 described below.

Figure 5:
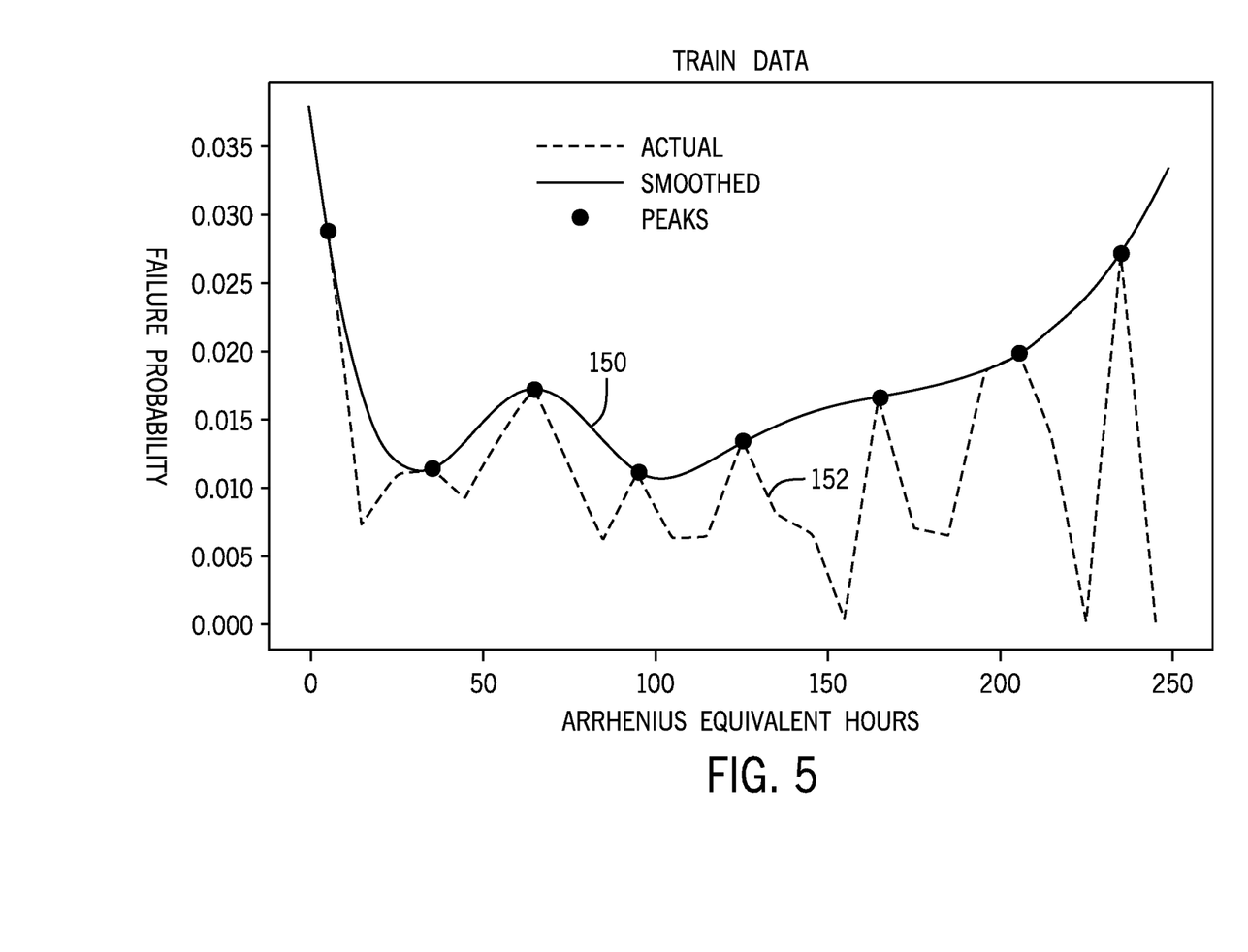
FIG. 5 depicts a graph of Arrhenius equivalent hours by failure probability, in accordance with embodiments of the present disclosure.

FIG. 5 depicts a graph of Arrhenius equivalent hours by tool failure probability. An average (or peak) failure trend 150 is used for the tool failure prediction rather than an actual failure trend 152 (e.g., from modeling each subset of temperature samples corresponding to a different range of Arrhenius equivalent hours). The failure probability values may be interpolated using interpolation methods (e.g., linear or cubic spline interpolation) to smooth failure probabilities and eliminate outliers.

Figure 6:
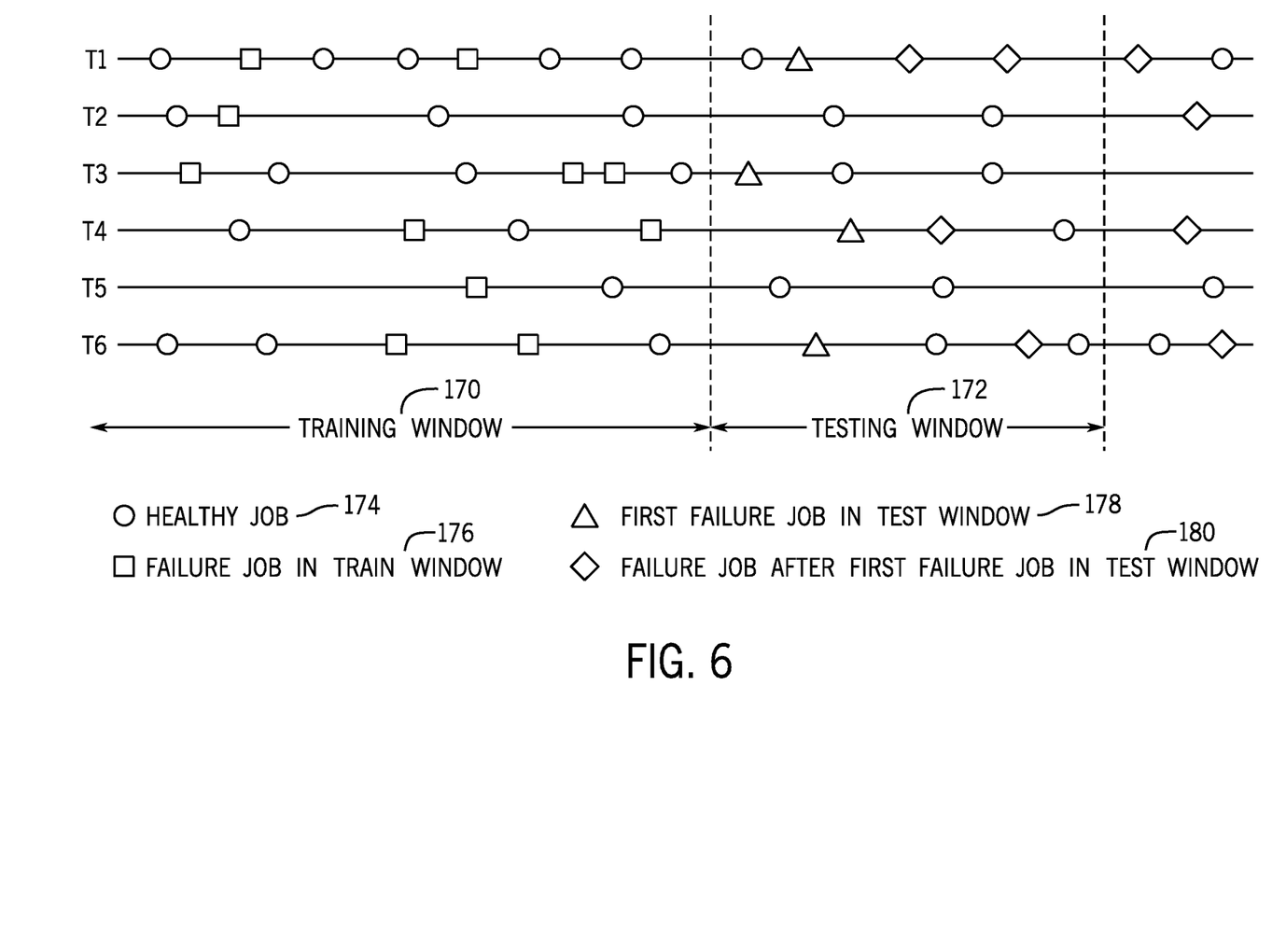
FIG. 6 depicts a representation of tool assets, job status, and tool risk indices, in accordance with embodiments of the present disclosure.

With the proceeding in mind, FIG. 6 depicts a representation of tool assets, job status, and a tool risk index. For each tool asset, the tool risk index may represent a risk assessment factor. While interpreting the tool risk index as the tool failure probability may reduce the number of tool modelling approaches, a more general approach may use the tool risk index to rank tool assets in an order of tool failure probability.

The end-to-end digital tool asset management system 50 may generate tool risk indices for a group of tool assets based on the historical tool asset data (e.g., tool asset maintenance history, tool asset failure history, and so forth). For example, the end-to-end digital tool asset management system 50 may retrieve a tool asset maintenance history and a tool asset failure history for each tool asset of the group of tool assets from a database (e.g., the organizational data lake 54). Based on tool asset risk assessment (e.g., tool asset modeling) using the tool asset maintenance history and tool asset failure history, the end-to-end digital tool asset management system 50 may generate the tool risk index for each tool asset. The end-to-end digital tool asset management system 50 may then compare the tool risk indices of different tool assets and determine a tool failure probability for each tool asset.

In some embodiments, modelling the actual tool risk probability may be impractical (e.g., with limited data available), the tool risk index may be used with a general tool ranking. Transitioning from a tool risk index to a tool risk probability may be driven by data (e.g., data quality) acquired for every tool in the large asset fleet.

Each tool asset modeling job may either be in a healthy state or a failed state, represented by a binary data class (e.g. a binary code 0 may represent a failed state, a binary code 1 may represent a healthy state). States of each tool asset modeling job may be aggregated at a pre-determined time interval (e.g., a day, a week, a month). A ratio of the number of failed tool asset modeling jobs to the total number of tool asset modeling jobs may be determined in a regression data process. Different error metrics may be used to analyze and evaluate the ratios from the tool asset modeling jobs.

For a large and complex range of tool asset families, a model validation metric may be selected (e.g., by the end-to-end digital tool asset management system 50, the data scientist 58, or the administrator). The model validation metric may provide functions to compare different machine learning models for the same tool asset family. The model validation metric may also provide functions to compare different machine learning models for different tool asset families. The model validation metric may assign a higher tool risk index to a risky tool asset (e.g., a tool asset with a relatively higher tool failure probability) and a lower tool risk index to a healthy tool (e.g., a tool asset with a relatively lower tool failure probability). The model validation metric may use relative values given to risky versus healthy tools as opposed to absolute values. In some embodiments, the model validation metric may use a swap ratio as a quality metric model.

For the tool asset modeling jobs, a testing window may be defined and the tool asset data (e.g., the tool asset maintenance history, the tool asset failure history, and so forth) outside this window may be taken as training data to train models (e.g. the tool asset models). For example, the tools may be compared using the status of a first tool asset modeling job in the testing window. A higher tool risk index may imply a risky tool and a lower risk index may imply a healthy tool.

Returning to FIG. 6, six tools (T1, T2, T3, T4, T5, and T6) are presented. Each circle 174 represents a healthy job (e.g., tool asset modeling job) associated with a given tool while a square 176, a triangle 178, or a diamond 180 represents a failed job. The squares 176 represent failed jobs in a training window 170. The triangles 178 represent failed jobs in a testing window 172. The diamonds 180 represent failed jobs after the testing window 172. For model validation or testing, the first job in the testing window 172 may be interesting. For instance, if the first job in the testing window 172 is a triangle 178, the corresponding tool is a relatively risky tool, and if the first job in the testing window 172 is a circle 174, the corresponding tool is a relatively healthy tool. In FIG. 6, tools T3, T4, and T6 are the relatively risky tools, while tools T1, T2, and T5 are the relatively healthy tools. In response, a more accurate model may provide higher tool risk indices to tools T3, T4, and T6 than the tools T1, T2, and T5. For the three relatively risky tools and the three relatively healthy tools, there are nine possible tool combinations represented by nine pairs, {(T3, T1), (T3, T2), (T3, T5), (T4, T1), (T4, T2), (T4, T5), (T6, T1), (T6, T2), (T6, T5)}. The pairs that have a higher tool risk index may imply a risky tool combination. The ratio of the pairs having the higher tool risk index to the total pairs is referred to as the swap ratio. The swap ratio may be used as a testing and validation metric.

In some embodiments, an advanced version of the swap ratio, such as c-statistics, may be used. With an expectation that the probability prediction for failed jobs is greater than normal healthy jobs, the count of jobs that are concordant, discordant, or tie may be determined. An index value known as the c-index is calculated, which can evaluate the discriminatory performance of a given model as, $$c\text{-index} = (\text{number of cordant pairs} + 0.5 \times \text{tie pairs})/(\text{All pairs}) \quad (3)$$

This concordance statistic is equal to the area under the receiver operating characteristic (ROC) curve with the values ranging from 0.5 to 1, where 1 indicates perfect discrimination and 0.5 corresponds to a model with no discrimination ability. This approach may save the need to fix arbitrary threshold values for classifying a prediction as a failure or not, as it varies with use cases. Also, the c-statistics method considers all thresholds as it is the same as the area under the ROC curve. This approach is useful when there is no trade-off between the false positives and false negatives.

For each model deployed to the framework orchestration and monitoring platform 70, swap ratios and/or c-statistics for a given time period (e.g., a week, a month, a quarter, and so forth) may be tracked. When a model for a model family is deployed, certain values, such as a lower bound on the mean and an upper bound on the variance of corresponding metrics (e.g., testing and validation metric) may be provided, which may trigger a model re-training job for the model family. For instance, these values may be based on cross-validation on training data and confirmed for the model family. The metrics may continue to be updated in a timely manner based on the model performance and feedback from users. Based on user feedback, model parameters may be adjusted or re-adjusted for a complete re-modelling for each model family. The metrics may further be made available to the sustenance engineer 72 and/or a subject matter expert.

The architecture for the end-to-end digital tool asset management system 50 may be implemented for various tool families, such as electric power cartridges, gamma ray neutron sondes, telemetry cartridges, pump out modules, and so forth. The tool asset data may be segregated and preprocessed to obtain desirable features as input data (e.g., vector data) for each tool family. Features including job information, such as borehole temperature (BHT) per job, pressure, density, failure details and maintenance records may be utilized for tool asset modeling based on the tool characteristics. Various engineering techniques may be used for each family, such as dimensionality reduction, sampling, and other custom-made features. Additionally, machine learning models, such as random forest, support vector machines (SVM), gradient boost, and linear regression may be deployed for different tool families.

Each tool asset model may be validated with the tool asset data over a specified time period and resulted in c-index values in a specific range (e.g., 0.8-0.9 on an average). The end-to-end digital tool asset management system 50 may keep track of the validation results for a given time period (e.g., a week, a month, a quarter, and so forth) and evaluate the validation results to determine whether a model re-training is desired.

In some embodiments, the end-to-end digital tool asset management system 50 may be scheduled to run on a daily to a monthly basis. In certain embodiments, tool failure predictions may be run once per day, or at some other time interval. In some embodiments, tool asset machine learning training jobs may all be submitted in parallel or may be combined by the code requirement level (like Python, R, Octave, etc., at higher level to the individual package requirements at lower level).

The next step for such a system may be to move from daily to near real time predictions, where along with daily tool job history, real time tool sensor data may be analyzed. Though the training architecture for such a framework could be exactly the same, there may be changes in the prediction architecture. Along with a big data ETL engine, a streaming analytics engine (e.g., Google Cloud Platform would be Cloud IoT Core with Dataflow) may be used.

For organizations with a very large fleet of assets, building a digital tool asset management platform is an essential step towards data-driven prognostics and health management (PHM). The digital tool asset management platform demands deep technical expertise in multiple areas, such as machine learning, asset level domain knowledge, digital infrastructure, and cloud offerings. The present disclosure provides guidelines on building a cost-effective framework with fast response times, plus secure and reliable operations to avoid unscheduled downtime with systematic fleet maintenance policies. A generic framework that scales automatically with demand may be developed that monitors activities continuously with easy configurations for tool onboarding, output storage and visualization. A risk assessment factor for the tool families may be defined that may be used to compare different tools based on a common metric. These tool-to-tool comparisons may be scheduled on regular intervals within this framework to ensure minimal tool failures during jobs.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. A method, comprising:
 receiving, via one or more computing devices, tool data comprising a maintenance history and a failure history for each tool of a plurality of tools;
 iteratively generating, via the one or more computing devices, a tool risk index for each tool of the plurality of tools based on tool modeling using a tool model, the maintenance history, and the failure history, wherein the tool model includes Arrhenius equivalent hours as a function of an activation energy, a Boltzmann's constant, a reference temperature, and an operating temperature, wherein the tool risk index excludes a probability of failure for each tool of the plurality of tools, and the maintenance history and the failure history are combined to form a weighted tool data source;
 comparing, via the one or more computing devices, tool risk indices of the plurality of tools to obtain a risk comparison based on a common metric, wherein the risk comparison comprises ranking a real-time tool health of the plurality of tools from high risk to low risk according to the tool risk indices;
 determining, via the one or more computing devices, the probability of failure for each tool of the plurality of tools based only on the risk comparison of the tool risk indices;
 outputting, via the one or more computing devices, a real-time visualization of the real-time tool health based on the probability of failure for each tool of the plurality of tools via a visualization tool;
 predicting, via the one or more computing devices, a tool failure of at least one tool of the plurality of tools based on a trend over time of the probability of failure for the at least one tool;
 identifying, via the one or more computing devices, the at least one tool of the plurality of tools having the predicted tool failure as needing a risk mitigation action;
 selecting, via the one or more computing devices, the risk mitigation action comprising an overhaul or a retirement of the at least one tool of the plurality of tools;
 automatically, via the one or more computing devices, taking the at least one tool of the plurality of tools offline to avoid an unscheduled downtime of oil and gas production caused by an actual tool failure; and
 executing, via the one or more computing devices, at least a portion of the risk mitigation action comprising the overhaul or the retirement of the at least one tool of the plurality of tools based on the real-time tool health.

2. The method of claim 1, comprising receiving the tool data from a database comprising a data lake, and continuously receiving the tool data from the data lake through an ingestion/subscription service.

3. The method of claim 1, comprising generating optimized asset-to-operation mappings based on the tool risk indices to map the plurality of tools to corresponding field operations to maximize productivity and minimize the probability of failure.

4. The method of claim 1, wherein the tool model is a digital representation of a corresponding tool of the plurality of tools, wherein the Arrhenius equivalent hours is based on a first equation:

$$t_{spent} = t_{operation} \cdot AF$$

where AF is an acceleration factor based on a second equation:

$$AF = e^{Ea/h(1/T_{ref} - 1/T_o)}$$

where $E_a$ is the activation energy, h is the Boltzmann's constant, $T_{ref}$ is the reference temperature, and $T_o$ is the operating temperature.

5. The method of claim 1, comprising using tool data outside of a testing window to train the tool model using machine learning.

6. The method of claim 1, comprising validating the tool model through the tool modeling based on a model validation metric, wherein the model validation metric comprises a swap ratio, the plurality of tools is arranged in a plurality of pairs, and the swap ratio is a ratio of the tool risk index for each pair of the plurality of pairs relative to a total number of pairs.

7. The method of claim 1, comprising:
analyzing tool sensor data of the plurality of tools in real-time, wherein the tool data comprises the tool sensor data; and
determining the probability of failure comprises real-time predictions of the probability of failure for each tool of the plurality of tools.

8. The method of claim 6, comprising triggering tool model re-training based on a lower bound on a mean value and an upper bound on a variance value of the model validation metric.

9. The method of claim 1, comprising:
producing, by a tool failure prediction, an average failure trend or a peak failure trend; and
determining the probability of failure for each tool of the plurality of tools based on the average failure trend or the peak failure trend produced by the tool failure prediction.

10. The method of claim 9, comprising interpolating the probability of failure for each tool of the plurality of tools using linear or cubic spline interpolation to smooth the probability of failure and eliminate outliers.

11. The method of claim 1, wherein the plurality of tools comprises at least a thousand tools.

12. The method of claim 1, comprising:
generating a cloud framework comprising the visualization tool and a plurality of failure prediction models for the plurality of tools, wherein the plurality of failure prediction models comprise the tool model;
comparing prediction accuracies of the plurality of failure prediction models for a selected tool of the plurality of tools; and
selecting a specific model of the plurality of failure prediction models for the selected tool of the plurality of tools based on the comparison of prediction accuracies.

13. The method of claim 12, comprising:
comparing predictions and model training across the plurality of failure prediction models in relation to the selected tool of the plurality of tools; and
training the specific model of the plurality of failure prediction models for the selected tool of the plurality of tools based on the comparison of predictions and model training.

14. The method of claim 1, comprising:
iteratively predicting failure trends using the Arrhenius equivalent hours at a time interval;
predicting an impending tool failure; and
initiating the overhaul or the retirement based on the impending tool failure.

15. A system for managing a plurality of tools of an organization in a cloud computing environment, comprising:
one or more computing devices comprising a processor, a memory, and instructions configured to operate:
an organizational data lake storing tool data associated with the plurality of tools, wherein the tool data comprises a maintenance history and a failure history for each tool of the plurality of tools;
a project data pond associated with ongoing projects related to the plurality of tools, wherein the project data pond continuously receives the tool data from the organizational data lake;
an on-demand data extract, transform, and load (ETL) component communicating the tool data with the project data pond;
a project code repository storing a plurality of templates corresponding to a plurality of tool models digitally and mathematically representative of the plurality of tools; and
a framework orchestration and monitoring platform configured to manage the ongoing projects, wherein the system is configured to:
iteratively generate a tool risk index for each tool of the plurality of tools based on tool modeling using a tool model of the plurality of tool models, the maintenance history, and the failure history, wherein the tool model includes Arrhenius equivalent hours as a function of an activation energy, a Boltzmann's constant, a reference temperature, and an operating temperature, wherein the tool risk index excludes a probability of failure for each tool of the plurality of tools, and the maintenance history and the failure history are combined to form a weighted tool data source;
compare tool risk indices of the plurality of tools to obtain a risk comparison based on a common metric, wherein the risk comparison comprises ranking a real-time tool health of the plurality of tools from high risk to low risk according to the tool risk indices;
determine the probability of failure for each tool of the plurality of tools based only on the risk comparison of the tool risk indices;
output a real-time visualization of the real-time tool health based on the probability of failure for each tool of the plurality of tools via a visualization tool;
predict a tool failure of at least one tool of the plurality of tools based on a trend over time of the probability of failure for the at least one tool;
identify the at least one tool of the plurality of tools having the predicted tool failure as needing a risk mitigation action;
select the risk mitigation action from a plurality of options comprising an overhaul or a retirement of the at least one tool of the plurality of tools;
automatically take the at least one tool of the plurality of tools offline to avoid an unscheduled downtime of oil and gas production caused by an actual tool failure; and
execute at least a portion of the overhaul or the retirement of the at least one tool of the plurality of tools based on the real-time tool health.

16. The system of claim 15, wherein the ongoing projects comprises training, testing, and validation of the plurality of tool models, and the plurality of tools models comprises a plurality of machine learning models.

17. The system of claim 15, wherein the ETL component is configured to:
extract the tool data from the project data pond;
transform the extracted tool data into a pre-defined data format specific to the organization; and
load the transformed data back into the project data pond.

18. The system of claim 15, comprising a code change tracking component configured to track code changes of code stored in the project code repository, wherein the code changes comprise template check-out, customization, check-in, and deletion.

19. The system of claim 18, comprising a tool level machine learning module configured to:
- enable a user to add one or more machine learning models to the project code repository via the code change tracking component; and
- enable the user to submit tool model training, validation, and testing jobs for the plurality of tools to run in parallel in the cloud computing environment.

20. The system of claim 15, comprising a continuous integration and continuous delivery (CI/CD) pipeline component configured to enable code automations for a user to facilitate tool model training, validation, and testing jobs for the plurality of tools to run in parallel in the cloud computing environment.

21. A non-transitory, computer-readable medium storing instructions that, when executed by one or more processors, are configured to cause the one or more processors to:
- receive tool data comprising a maintenance history and a failure history for each tool of a plurality of tools;
- iteratively generate a tool risk index for each tool of the plurality of tools based on tool modeling using a tool model, the maintenance history and the failure history, wherein the tool model includes Arrhenius equivalent hours as a function of an activation energy, a Boltzmann's constant, a reference temperature, and an operating temperature, wherein the tool risk index excludes a probability of failure for each tool of the plurality of tools, and the maintenance history and the failure history are combined to form a weighted tool data source;
- compare tool risk indices of the plurality of tools to obtain a risk comparison based on a common metric, wherein the risk comparison comprises ranking a real-time tool health of the plurality of tools from high risk to low risk according to the tool risk indices;
- determine the probability of failure for each tool of the plurality of tools based only on the risk comparison of the tool risk indices;
- output a real-time visualization of the real-time tool health based on the probability of failure for each tool of the plurality of tools via a visualization tool;
- predict a tool failure of at least one tool of the plurality of tools based on a trend over time of the probability of failure for the at least one tool;
- identify the at least one tool of the plurality of tools having the predicted tool failure as needing a risk mitigation action;
- select the risk mitigation action from a plurality of options comprising an overhaul or a retirement of the at least one tool of the plurality of tools;
- automatically take the at least one tool of the plurality of tools offline to avoid an unscheduled downtime of oil and gas production caused by an actual tool failure; and
- execute at least a portion of the overhaul or the retirement of the at least one tool of the plurality of tools based on the real-time tool health.

* * * * *